United States Patent [19]

Akatsu et al.

[11] Patent Number: 4,690,618

[45] Date of Patent: Sep. 1, 1987

[54] BOOSTER TYPE HIGH-PRESSURE VESSEL

[75] Inventors: Makoto Akatsu; Keiichi Hori, both of Hiroshima, Japan

[73] Assignee: Mitsubishi Jukogyo Kabushiki Kaisha, Tokyo, Japan

[21] Appl. No.: 780,681

[22] Filed: Sep. 26, 1985

[30] Foreign Application Priority Data

Oct. 1, 1984 [JP] Japan .................. 59-204155

[51] Int. Cl.$^4$ .................................................. F04F 7/02
[52] U.S. Cl. .................................... 417/226; 92/110; 417/392
[58] Field of Search .................... 417/225, 226, 392; 92/92, 110

[56] References Cited

U.S. PATENT DOCUMENTS

| 214,979 | 4/1879 | Yellott | 417/226 |
|---|---|---|---|
| 512,776 | 1/1894 | Weatherhead | 417/392 |
| 602,666 | 4/1898 | Roeder | 417/392 |
| 697,303 | 4/1902 | Wentworth | 417/226 |
| 3,407,601 | 10/1968 | Beck | 417/226 X |
| 3,572,035 | 3/1971 | Beroset | 92/171 X |

Primary Examiner—Carlton R. Croyle
Assistant Examiner—Theodore Olds
Attorney, Agent, or Firm—Wenderoth, Lind & Ponack

[57] ABSTRACT

In a booster type high-pressure container including an outer cylinder associated with upper and lower lids and an inner cylinder fitted in the outer cylinder with a gap clearance retained therebetween, a booster chamber is provided between a piston disposed within the inner cylinder at its bottom portion and the lower lid of the outer cylinder, a boosting liquid medium is injected into the booster chamber for pushing up the inner cylinder jointly with the piston to boost the pressure within the inner cylinder, and the gap clearance communicates with the booster chamber.

4 Claims, 4 Drawing Figures

BOOSTER TYPE HIGH-PRESSURE VESSEL

BACKGROUND OF THE INVENTION

1. Field of the Invention

The present invention relates to a booster type high-pressure vessel that is available for cold hydrostatic pressurizing treatment or the like.

2. Description of the Prior Art

The inventors of this invention developed and previously proposed a self-balancing booster type high-pressure vessel provided with a booster piston as a super high-pressure container having a high factor of safety that is available for cold hydrostatic pressurizing treatment or the like.

The above-referred known as a self-balancing booster type high-pressure container has a basic construction as shown in FIG. 4. More particularly, with reference to FIG. 4, a high-pressure vessel (1) comprises an outer cylinder (1a) having an upper lid (2) and a lower lid (3) fitted thereto, and an inner cylinder (1b) fitted inside the outer cylinder (1a) with a gap clearance ($\alpha$) retained therebetween, and packings (5) around the inner cylinder (1b), the upper lid (2) and the lower lid (3). In addition, a piston (4) having a stepped configuration is fitted between the upper lid (2) and the upper portion of the inner cylinder (1b) in a vertically slidable manner, a larger diameter portion and a smaller diameter portion of the piston (4) being disposed within the outer cylinder (1a) and the inner cylinder (1b), respectively, in a liquid-tight and slidable manner by packages (5). A high-pressure liquid medium ($P_1$) is poured and fed onto a top surface (4a) of the piston (4) through feed pipes ($a_1$) and ($a_2$) and a feed hole (6) provided in the upper lid (2). In the piston (4) is an inflow hole (10) associated with a spring-loaded check valve (10a), which hole is disposed so as to communicate with the feed hole (6) and the interior of the inner cylinder (1b). Also, an escape hole (8) is provided in the outer cylinder (1a) so as to communicate with a space (7) confined between the piston (4) and the top portion of the inner cylinder (1b). This escape hole (8) is connected with a feed pipe ($a_3$) and an exhaust pipe ($b_3$) of a low-pressure liquid medium ($P_4$), and another exhaust pipe ($b_5$) is connected with an exhaust hole (9) provided in the lower lid (3).

In addition, in FIG. 4, reference character (A) designates a pressure setter, reference characters (B), (C) and (D) designate high-pressure gate valves provided in the exhaust pipes ($b_5$), ($b_3$) and ($b_1$), respectively, reference numeral (E) designates a check valve provided in the feed pipe ($a_3$) and reference character (F) designates a pressure gauge disposed in the exhaust pipes ($b_1$) and ($b_3$).

Since the booster type high-pressure vessel shown in FIG. 4 is constructed as described above, if the interior of the inner cylinder ($1_b$) is filled with a liquid medium to bring it into the state shown in FIG. 4 and a high pressure $P_1$ is applied to the top surface (4a) of the piston (4) by injecting a high-pressure liquid medium ($P_1$) through the feed hole (6), then the piston (4) moves downwards, hence the liquid medium within the inner cylinder (1b) is boosted up to a pressure $P_2$, and then balance of the loads applied to the piston (4) is represented by the following equation:

$$P_1 A_1 = P_2 A_2 + P_3 A_3 \tag{1}$$

where
- $A_1$: pressure receiving area of the top surface of the piston (4)
- $A_2$: pressure receiving area of the bottom surface of the piston (4)
- $A_3$: pressure receiving area of the stepped portion of the piston (4)

$$A_1 = A_2 + A_3 \tag{2}$$

The balancing condition is represented by Equations (1) and (2) above, and the relation of $P_2 > P_1 > P_3$ is fulfilled, that is, compared to the pressure $P_1$ of the high-pressure liquid medium (P), the boosting liquid medium pressure $P_2$ of the liquid medium within the inner cylinder (1b) is high, while a pressure $P_3$ within the space (7) and the gap clearance ($\alpha$) is low.

In the above-described known booster type high-pressure vessel, the inner cylinder (1b) forming the high-pressure vessel is designed so as to have a rating pressure adapted for the pressure ($P_2 - P_3$), while the outer cylinder (1a) is designed so as to be adapted for the pressure $P_1$, hence the entire high-pressure vessel is designed so as to be adapted for the pressure ($P_1 + P_2 - P_3$), and so, the vessel is constructed so as to have a large wall thickness. Further, in accordance with the design of the container, the force applied to a yoke frame (not shown) for supporting the high-pressure vessel also becomes large. Hence, a large-sized yoke frame becomes necessary, and since the inner cylinder (1b) is subjected to a pressure variation of the pressure ($P_2 - P_3$), the fatigue strength of the inner cylinder cannot be sufficiently assured. Moreover, upon loading of a work to be treated, it is necessary to mount and dismount the upper lid to and from the piston, and so, troublesome operations are necessary. The known booster type high-pressure container was associated with such technical problems to be resolved.

SUMMARY OF THE INVENTION

It is therefore one object of the present invention to provide a booster type high-pressure vessel that is free from the above-described shortcomings of the booster type high-pressure vessel in the prior art.

A more specific object of the present invention is to provide a novel booster type high-pressure vessel, in which a pressure difference between the inside and the outside of the inner cylinder as well as pressure variations can be greatly reduced and hence reduction of the wall thickness of the container is possible.

Another object of the present invention is to provide a novel booster type high-pressure vessel, which has improved fatigue strength, container strength and reliability.

Still another object of the present invention is to provide a novel booster type high-pressure vessel, in which loading and unloading operations of work are easy.

According to one feature of the present invention, there is provided a booster type high-pressure vessel including an outer cylinder associated with upper and lower lids and an inner cylinder fitted in the outer cylinder with a gap clearance retained therebetween, in which a booster chamber is provided between a piston disposed within the inner cylinder at its bottom portion and the lower lid of the outer cylinder, a boosting liquid medium is adapted to be injected into the booster chamber for pushing up the inner cylinder jointly with the piston to boost the pressure within the inner cylinder, and the gap clearance is communicated with the booster chamber.

According to the present invention, due to the above-mentioned construction of the booster type high-pressure vessel, a pressure difference between the inside and the outside of the inner cylinder as well as pressure variations can be greatly reduced, reduction in the wall thickness of the vessel is made possible, fatigue strength can be improved, vessel strength and reliability are greatly improved in association with small-sizing of the vessel, and loading and unloading operations of work are facilitated.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

Figure 1:
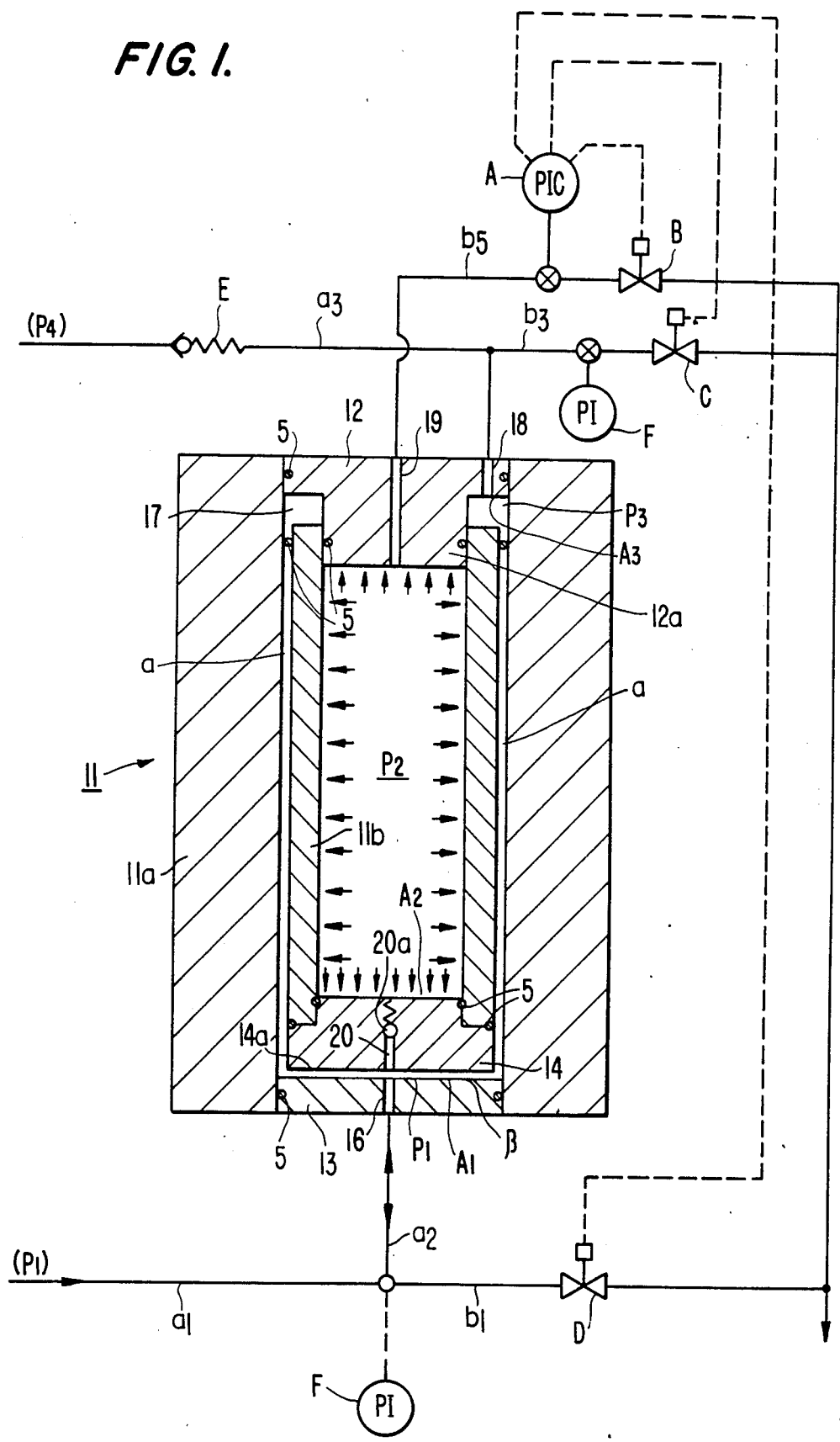
FIG. 1 is a system diagram partly in cross-section showing a first preferred embodiment of the present invention.

A first preferred embodiment of the present invention is shown in FIG. 1. In this figure, reference numeral (11a) designates an outer cylinder, numeral (11b) designates an inner cylinder fitted inside the outer cylinder (11a) in a vertically movable manner with a gap clearance ($\alpha$) formed therebetween, numeral (12) an upper lid fitted in the top portion of the outer cylinder (11a), numeral (13) a lower lid fitted in the bottom portion thereof, and numerals (5) around the upper lid (12) and the lower lid (13), and thereby a liquid seal for the high-pressure vessel (11).

Furthermore, a piston (14) is fixedly provided at the bottom portion of the inner cylinder (11b) by the intermediary of packings (5), the lower lid (13) is provided with a feed hole (16), in the piston (14) is an inflow hole (20) associated with a check valve (20a), a booster chamber ($\beta$) is formed between the top surface of the lower lid (13) and the bottom surface (14a) of the piston (14), the booster chamber ($\beta$) communicates with the gap clearance ($\alpha$) between the inner cylinder (11b) and the outer cylinder (11a), and the top portion of the gap clearance ($\alpha$) is blocked by a packing (5). In addition, the above-mentioned upper lid (12) is formed in a stepped configuration with its smaller diameter portion (12a) fitted with the inner cylinder (11b) via a packing (5) so as to be slidable relative to each other. Hence, a space (17) is formed between the top portion of the inner cylinder (11b) and the stepped portion of the upper lid (12), and further an escape hole (18) communicates with the space (17).

Moreover, the feed hole (16) in the lower lid (13) communicates with a feed pipe ($a_1$) and an exhaust pipe ($b_1$) through a feed pipe ($a_2$), an exhaust hole (19) in the upper lid (12) communicates with an exhaust pipe ($b_5$), the escape hole (18) communicates with a feed pipe ($a_3$) and an exhaust pipe ($b_3$), and similarly to the above-described known booster type high-pressure vessel in the prior art, a pressure setter (A), high-pressure gate valves (B), (C) and (D), a check valve (E) and pressure gauges (F) are disposed in the respective pipes.

Now, description will be made as to the operation of the booster type high-pressure vessel according to a first preferred embodiment of the present invention, which is constructed as described above. After a low-pressure liquid medium (water) (pressure $P_4=3-5 kg/cm^2$) has been fed into the high pressure vessel (11) and has filled the interior of the vessel, the upper lid (12) is inserted and fitted into the outer cylinder (1a) and the inner cylinder (1b). Then, with the high-pressure gate valve (B) in the exhaust pipe ($b_5$) opened, a surplus liquid medium is exhausted through the exhaust hole (19), and also with the high-pressure gate valve (C) opened a surplus liquid medium within the space (17) is exhausted externally through the escape hole (18).

Subsequently, while the upper and lower lids (12) and (13) are supported jointly with the high-pressure vessel (11) by means of a yoke frame or the like not shown, a high-pressure liquid medium (water) (pressure $P_1=1000-2000 kg/cm^2$) is fed through the feed hole (16). Then the high-pressure liquid medium further flows into the inner cylinder (11b) through the inflow hole (20) and the check valve (20a). Hence, the inner pressure is raised. Subsequently, the high-pressure liquid medium acts upon the bottom surface (14a) of the piston (14) as a boosting liquid in the booster chamber ($\beta$) to move the inner cylinder (11b) upwards jointly with the piston (14), whereby the pressure within the inner cylinder (11b) is further raised, that is, boosted, and this boosted pressure is maintained by closure of the check valve (20a).

Now, representing a pressure receiving area of the bottom surface (14a) of the piston (14) by $A_1$, a pressure receiving area of the top surface of the smaller diameter portion of the piston (14) by $A_2$ and a pressure receiving area of the top end surface of the inner cylinder (11b), that is, a pressure receiving area thereof in the space (17) at the stepped portion of the upper lid (12) by $A_3$, then the exerted pressures are balanced with one another under the condition of:

$$P_1 A_1 = P_2 A_2 + P_3 A_3$$

$$(A_1 = A_2 A_3)$$

($P_1$, $P_2$ and $P_3$ represent pressure exerted upon the pressure receiving areas $A_1$, $A_2$ and $A_3$, respectively) Under this condition, the inner cylinder (11b) and the piston (14) would stop, and the pressure $P_2$ within the inner cylinder (11b) would not rise further. However, if the high-pressure gate valve (C) is opened, then the liquid medium within the space (17) can be exhausted, hence the inner cylinder (11b) and the piston (14) would rise further, so that the inner pressure $P_2$ can be raised (boosted), and moreover, since the pressure $P_3$ within the space (17) also increases in association with the rise of the inner cylinder (11b) and the piston (14), the pressure $P_2$ within the high-pressure container (11) can be automatically and smoothly boosted and adjusted to an appropriate value by opening/closing operations of the high-pressure gate valve (C). In addition, the liquid medium pressure within the gap clearance (α) between the inner and outer cylinders (11b) and (11a) is equal to the pressure within the booster chamber (β).

When the inner pressure of the high-pressure vessel (11) is reduced, the feed of the high-pressure liquid medium is interrupted by an appropriate means (not shown), the pressurized liquid medium in the booster chamber (β) is exhausted by opening the high-pressure gate valve (D), whereby the pressure in the booster chamber (β) and the gap clearance (α) is lowered. At the same time the inner cylinder (11b) and the piston (14) are lowered by the inner pressure $P_2$, and this inner pressure $P_2$ is lowered. Subsequently, the high-pressure gate valves (B) and (C) are opened, whereby the inner pressure $P_2$ and the pressure $P_3$ in the space (17) can be reduced since they are opened to the atmosphere.

The opening/closing operations of the above-mentioned high-pressure gate valves (B), (C) and (D) are automatically controlled by electric signals issued from the pressure setter (A), but they can be also performed manually while confirming the pressure.

As described above, according to the present invention, due to the fact that the piston (14) is contained in the high-pressure vessel (11), the inner pressure can be greatly boosted smoothly and automatically. Also, the inner cylinder (11b) forming a principal member of the high-pressure vessel (11) is subjected to a pressure $(P_2-P_1)$ and hence can be constructed so as to have a rating pressure of $(P_2-P_1)$, while the outer cylinder (11a) has a rating pressure of $P_1$, and therefore, the entire wall thickness is adapted to a rating pressure of $(P_2-P_1)+P_1=P_2$ and hence can be made very thin. The fatigue strength of the inner cylinder (11b) is adapted for a pressure variation of $(P_2-P_1)$, so that the fatigue strength is remarkably improved, reliability of the high-pressure vessel is greatly enhanced as it is reduced in size and its inner pressure can be increased. Thus, the performance and reliability of the high-pressure container can be greatly improved.

Accordingly, the load applied to the yoke frame for supporting the high-pressure container also becomes light, hence the yoke frame can be made small in size, and also, upon loading and unloading a work to be treated into and from the high-pressure container, only mounting and dismounting operations of the upper lid are necessitated. Therefore, there is an advantage that the operation becomes simple.

Figure 2:
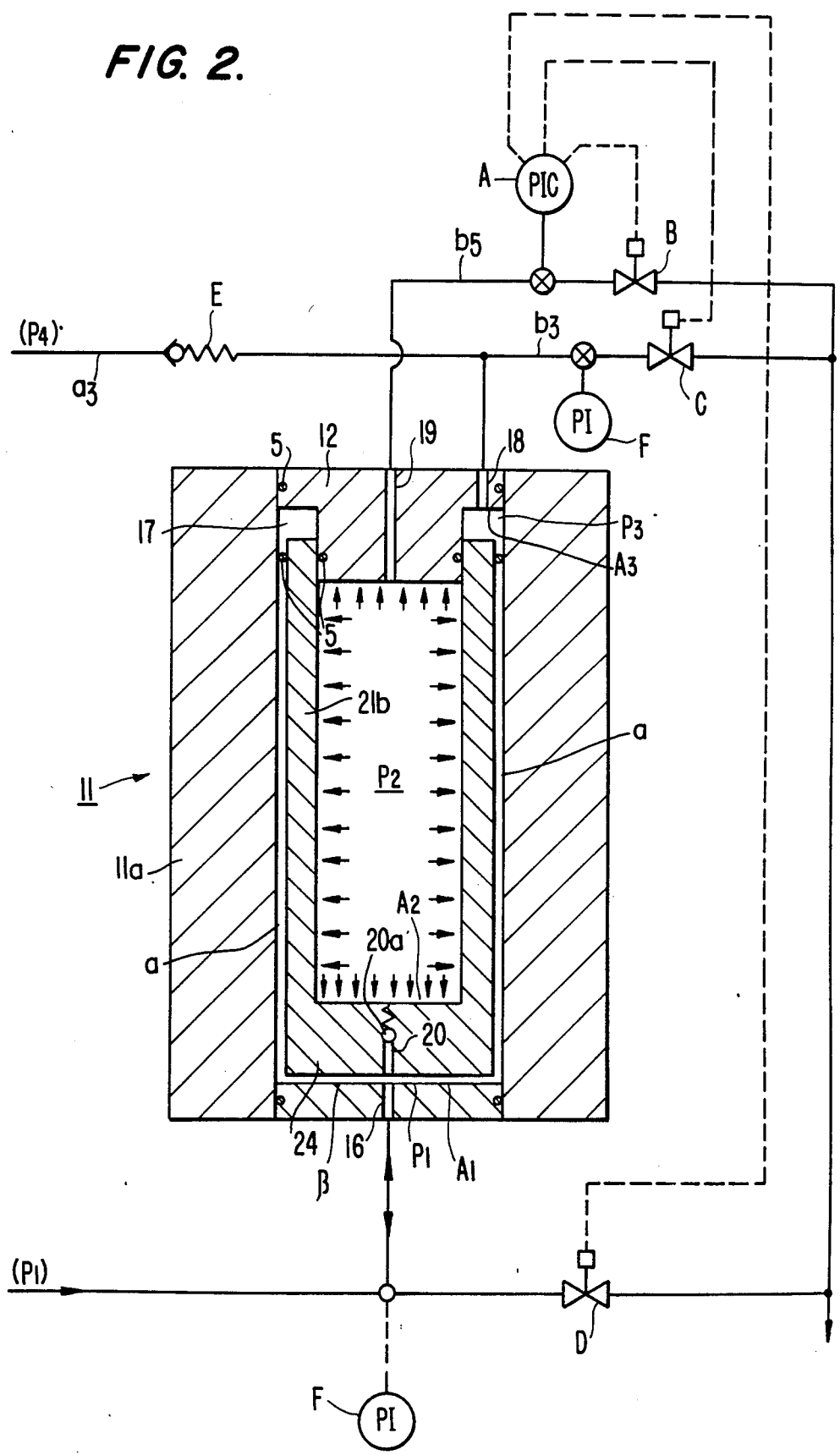
FIG. 2 is a system diagram partly in cross-section showing a second preferred embodiment of the present invention.

A second preferred embodiment of the present invention is shown in FIG. 2. Comparing this modified embodiment with the first preferred embodiment illustrated in FIG. 1, the former has a characteristic feature in that an inner cylinder (21b) is provided with a bottom wall (24) which has a construction corresponding to the above-described piston (14), and so, the structure of the modified embodiment is more simplified. With regard to the other construction, the modified embodiment is similar to the embodiment shown in FIG. 1 and therefore, similar effects and advantage can be obtained.

Figure 3:
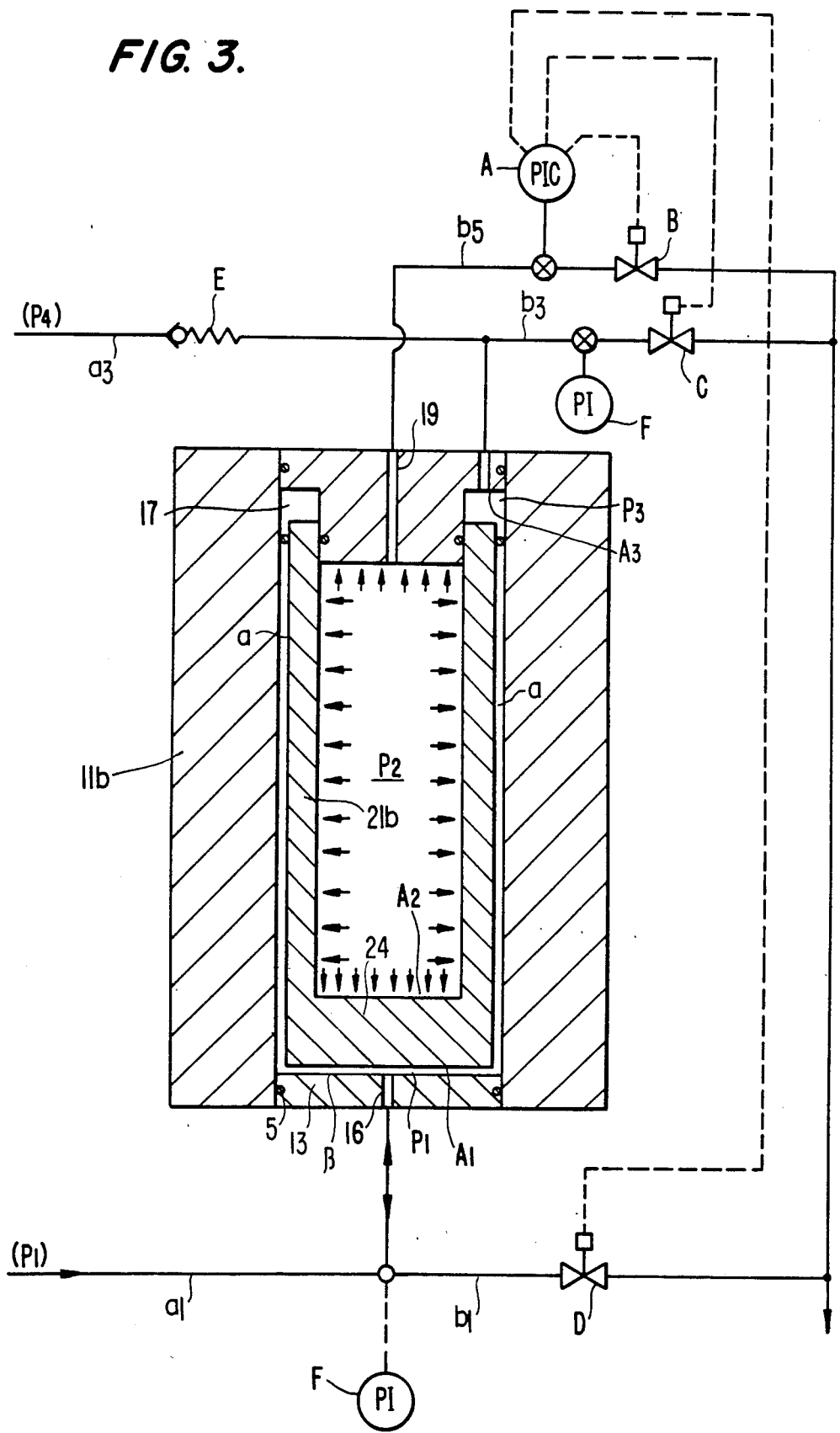
FIG. 3 is a system diagram partly in cross-section showing a third preferred embodiment of the present invention.
Figure 4:
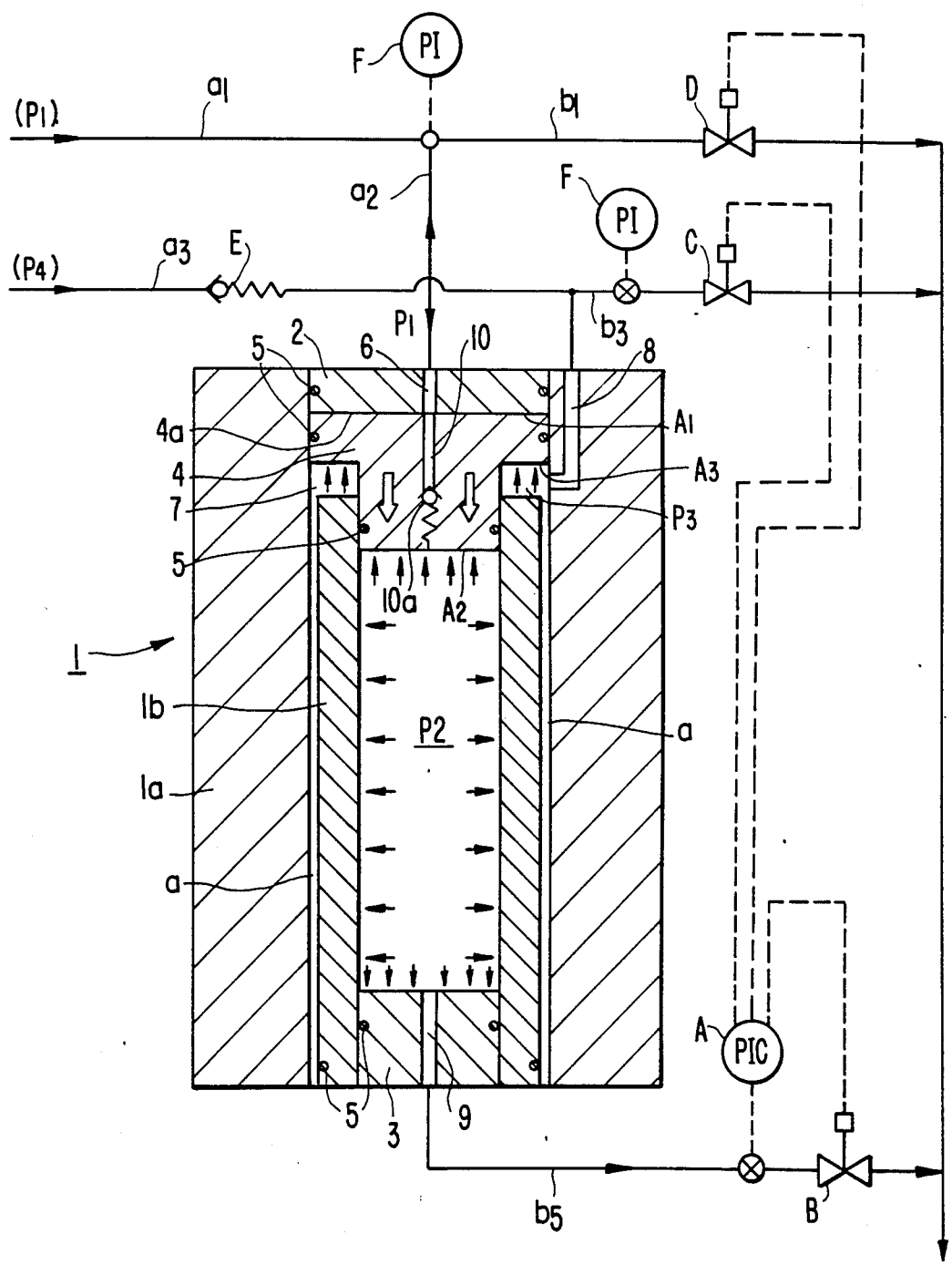
FIG. 4 is a system diagram partly in cross-section showing a known cold hydrostatic treatment system including a booster type high-pressure container in the prior art.

In addition, a third preferred embodiment of the present invention is shown in FIG. 3. Comparing this further modified embodiment with the second preferred embodiment illustrated in FIG. 2, the former has a characteristic feature in that an inflow hole (20) associated with a check valve (20a) is omitted from the bottom wall (24) of the inner cylinder (21b), because the above-described inflow hole (20) associated with the check valve (20a) can be made unnecessary by initially feeding and filling a liquid medium at a predetermined pressure in the interior of the inner cylinder (21b) from the side of the upper lid (12). With regard to the other construction, the modified embodiment is similar to the above-described first and second embodiments shown in FIGS. 1 and 2, and therefore, similar effects and advantages can be obtained.

While the present invention has been described above in connection to preferred embodiments thereof, it is a matter of course that the invention should not be limited to the illustrated embodiments but many changes and modifications in design could be made within the scope not departing from the spirit of the present invention.

What is claimed is:

1. A booster type high-pressure vessel apparatus for increasing the pressure of a liquid medium to pressure treat a work piece, said apparatus comprising:
    an outer cylinder having an upper lid at one end of said outer cylinder and a lower lid at the other end of said outer cylinder;
    an inner cylinder slidably mounted within said outer cylinder, said inner cylinder having an outer diameter that is less than the inner diameter of said outer cylinder such that a clearance gap is defined between the outer cylindrical surface of said inner cylinder and the inner cylindrical surface of said outer cylinder;
    a piston covering the end of said inner cylinder that is adjacent said lower lid, a pressure chamber in which the liquid medium is disposed being defined within said inner cylinder between said piston and said upper lid, and a booster chamber defined between said piston and said lower lid, said booster chamber open to and communicating with said clearance gap; and
    a hydraulic circuit means for injecting pressurized fluid into said booster chamber and said clearance gap open thereto for causing said inner cylinder to slide within said outer cylinder thereby pressurizing the liquid medium within the pressure chamber, said pressurized fluid in said clearance gap creating a first pressure acting on said inner cylinder therearound that opposes the pressure acting on said inner cylinder therein created by the liquid medium when it is pressurized.

2. A booster type high-pressure vessel apparatus as claimed in claim 1,
    wherein said piston has a passageway extending therethrough between said pressure chamber and said booster chamber and a check valve in said passageway for allowing said pressurized fluid to flow one-way from said booster chamber into said pressure chamber defined within said inner cylinder.

3. A booster type high-pressure vessel apparatus as claimed in claim 1, wherein said piston is a separate member from said inner cylinder and is fixedly mounted to said end of said inner cylinder that is adjacent said lower lid.

4. A booster type high-pressure vessel apparatus as claimed in claim 1, wherein said piston is integral with said inner cylinder at said end of said inner cylinder that is adjacent said lower lid.

* * * * *